No. 614,879. Patented Nov. 29, 1898.
E. MILLER.
FISH NET.
(Application filed Mar. 25, 1898.)
(No Model.)
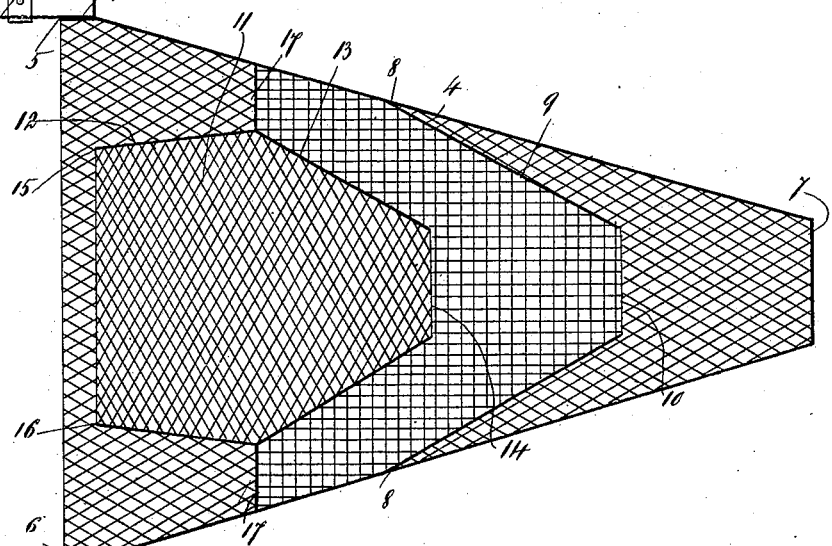
WITNESSES
John Buckler,
L. M. Muller
INVENTOR
Edward Miller
BY
Edgar Tate &c.
ATTORNEYS

UNITED STATES PATENT OFFICE.

EDWARD MILLER, OF NEW YORK, N. Y.

FISH-NET.

SPECIFICATION forming part of Letters Patent No. 614,879, dated November 29, 1898.

Application filed March 25, 1898. Serial No. 675,118. (No model.)

*To all whom it may concern:*

Be it known that I, EDWARD MILLER, a citizen of the United States, residing at New York, (Brooklyn,) in the county of Kings and State of New York, have invented certain new and useful Improvements in Fish-Nets, of which the following is a full and complete specification, such as will enable those skilled in the art to which it appertains to make and use the same.

This invention relates to fish-nets; and the object thereof is to provide an improved net for catching fish which is provided with a plurality of pockets so arranged that the fish may freely pass thereinto, but cannot escape therefrom, a further object being to provide an improved fish-net with improved means for operating the same.

The invention is fully disclosed in the following specification, of which the accompanying drawings form a part, in which—

Figure 1 is a plan view of my improved fish-net and means for operating the same; and Fig. 2, a side view thereof, the net being shown only in outline.

In the drawings forming part of this specification the separate parts of my improvement are designated by the same numerals of reference in each of the views, and in the practice of my invention I provide a net 4, which is of the form shown in the drawings, the large open end thereof being indicated between the points 5 and 6 and the closed end, which is much smaller than the open end, being shown at 7. The sides of the net taper from the large open end to the closed end, as clearly shown, and in practice I secure in said net, at about the middle thereof, as shown at 8, a conical pocket 9, the inner small end of which is open at 10, and said pocket is composed of the same material as the net proper. I also provide a supplemental pocket 11, which consists of a substantially annular portion 12, which opens outwardly and is much larger than the inner portion 13, which is conical in form and which is open at 14. The outer larger end of the supplemental pocket 11 is open between the points 15 and 16, and said supplemental pocket is connected with a main net by side lines at 17 or in any desired manner, the only object being to support said supplemental pocket-net concentrically of the main net. I also employ two guide-blocks 18, which in practice are about two feet and one-half deep and of any desired width across the top, and the forward ends of said guide-blocks are preferably inclined inwardly, as shown at 19, and the sides of the net 4 are connected with the inner sides of the guide-blocks 18 in any desired manner, as shown at 20.

The means for operating the guide-blocks and the net consist of bands 21, which are connected with said blocks, two of which are employed on each block, and to the upper transverse portion of the rear bands 21 are secured rings or eyes 22, to each of which is secured a rope or cord 23, and the ropes or cords 23 are passed through a ring or eye 24, secured to the forward band 21 and connected with a rope, cord, or line 25, and the ropes, cords, or lines 25 are carried to and connected with a boat, from which the net is operated.

In practice the guide-blocks 18 are weighted or may be composed of such material as will cause them to sink and carry with them the net, and in operating the net it is drawn over the bottom of the water or stream by means of the ropes, cords, or lines 25, which are under the control of an operator in the boat. In this operation the movement of the water over the forward ends of the guide-blocks 18 forces said blocks apart, and this movement of said blocks opens the forward end of the net, which is held open as long as the guide-blocks are pulled forwardly. As the net is thus operated the fish pass thereinto through the large open end thereof and backwardly through the pocket 9 and the supplemental pocket 11 into the smaller end of the net, as will be readily understood, in which they are retained until the net is raised to the surface or removed from the water. By providing the pocket 9 and the supplemental pocket 11 I provide devices to prevent the escape of fish from the net, but which do not interfere with their entrance thereinto.

Instead of using the bands 21 on the guide-blocks 18 I may secure strips to the top thereof only, and the bridle or ropes or cords for operating said blocks may be differently arranged, and other changes in and modifications of the constructions herein described may be made without departing from the spirit of my invention or sacrificing its advantages.

Having fully described my invention, I claim as new and desire to secure by Letters Patent—

1. A net which is provided with a large open and a smaller closed end, said net being provided at its larger end with two guide-blocks which are secured to the sides thereof, said guide-blocks being provided with ropes or cords which are secured to the rear ends thereof and which are passed through an eye or ring secured near the forward ends thereof, and connected with ropes which are adapted to be operated from a boat, substantially as shown and described.

2. A net which is provided with a large open and a smaller closed end, said net being also provided with a pocket which is conical in form and which is secured therein, and the inner end of which is directed inwardly toward the smaller end of the net, and a supplemental pocket secured concentrically in the larger open end of the net, the outer portion of said supplemental pocket being cylindrical in form and open, and the inner portion thereof being conical in form and open, said net being also provided at its larger end with two guide-blocks which are secured to the sides thereof, said guide-blocks being provided with ropes or cords which are secured to the rear ends thereof, and which are passed through an eye or ring secured near the forward ends thereof and connected with ropes which are adapted to be operated from a boat, substantially as shown and described.

3. A net which is provided with a large open and a smaller closed end, said net being also provided with a pocket which is conical in form, and which is secured therein, and the inner end of which is directed inwardly toward the smaller end of the net, and a supplemental pocket secured concentrically in the larger open end of the net, the outer portion of said supplemental pocket being cylindrical in form and open, and of less diameter than the corresponding portion of the net, and the inner portion of said supplemental pocket being conical in form and open, said net being also provided with two guide-blocks which are secured to the sides of the large open end thereof, and said guide-blocks being provided with bridles, substantially as shown and described.

In testimony that I claim the foregoing as my invention I have signed my name, in presence of the subscribing witnesses, this 24th day of March, 1898.

EDWARD MILLER.

Witnesses:
L. M. MULLER,
M. A. KNOWLES.